(12) United States Patent
Ewers et al.

(10) Patent No.: US 9,249,714 B2
(45) Date of Patent: Feb. 2, 2016

(54) METHOD AND DEVICE FOR FASTENING AN EXHAUST GAS CONVERTER MODULE

(75) Inventors: Roland Ewers, Paderborn (DE); Heinrich Gabriel, Borgentreich (DE); Mario Wegener, Borgentreich (DE); Artur Lesch, Steinheim (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 148 days.

(21) Appl. No.: 13/382,241

(22) PCT Filed: Jul. 6, 2010

(86) PCT No.: PCT/DE2010/000774
§ 371 (c)(1),
(2), (4) Date: Jan. 4, 2012

(87) PCT Pub. No.: WO2011/003395
PCT Pub. Date: Jan. 13, 2011

(65) Prior Publication Data
US 2012/0104224 A1 May 3, 2012

(30) Foreign Application Priority Data
Jul. 6, 2009 (DE) .................... 10 2009 031 980

(51) Int. Cl.
*F01N 13/18* (2010.01)
*F01N 3/00* (2006.01)

(52) U.S. Cl.
CPC .............. *F01N 13/1822* (2013.01); *F01N 3/00* (2013.01); *F01N 13/1855* (2013.01);
(Continued)

(58) Field of Classification Search
CPC ..... F16M 13/02; B23P 11/00; F01N 13/1822; F01N 13/1855; F01N 13/1872

USPC ........ 248/675, 201, 65, 202.1, 217.2, 225.11, 248/222.51, 222.52, 223.31, 223.41, 58, 248/73; 29/525.02
See application file for complete search history.

(56) References Cited

U.S. PATENT DOCUMENTS 3,986,544 A * 10/1976 Jones et al. .................. 411/103
6,687,996 B2 2/2004 Lesch et al.
(Continued)

FOREIGN PATENT DOCUMENTS

DE 10 2004 023 585 12/2005
DE 10 2006 010 973 9/2007
(Continued)

OTHER PUBLICATIONS

NPL: Dash Z Racing Blog, 2005-2006 Scion tC AEM Cold Air Intake Installation DIY Guide, Dec. 6, 2009 http://articles.dashzracing.com/2005-2006-scion-tc-aem-cold-air-intake-installation-diy-guide.*

*Primary Examiner* — Lindsay Low
*Assistant Examiner* — Jacob Amick
(74) *Attorney, Agent, or Firm* — Henry M. Feiereisen LLC

(57) ABSTRACT

The invention relates to a method for fastening an exhaust gas converter module (1) to an internal combustion engine (2) of a motor vehicle, wherein the exhaust gas converter module (1) is first connected to a pipe section of the exhaust gas system arranged upstream in the flow direction of the exhaust gas and is then pivoted about a pivot axis (S), wherein a two-part module bracket (4) engages with an engine bracket (3) and is coupled with the engine mount (3) in this installation position by a screw connection. The invention relates to a corresponding device having an engine bracket and a module bracket (3, 4).

14 Claims, 3 Drawing Sheets a) b) c)

(52) U.S. Cl.
CPC ........ *F01N 13/1872* (2013.01); *F01N 2450/24* (2013.01); *F01N 2450/30* (2013.01); *Y02T 10/20* (2013.01); *Y10T 29/49948* (2015.01)

(56) References Cited

U.S. PATENT DOCUMENTS 6,910,506 B2    6/2005   Gabriel et al.
2011/0215220 A1*  9/2011  Loebig .................... 248/674

FOREIGN PATENT DOCUMENTS

| FR | 2 856 735 A1 |   | 12/2004 |
|----|--------------|---|---------|
| FR | 2 867 252 A1 |   | 9/2005  |
| GB | 2 212 771 A  |   | 8/1989  |
| GB | 2212771 A    | * | 8/1989  |
| JP | 06-336922    |   | 12/1994 |

\* cited by examiner

METHOD AND DEVICE FOR FASTENING AN EXHAUST GAS CONVERTER MODULE

CROSS-REFERENCES TO RELATED APPLICATIONS

This application is the U.S. National Stage of International Application No. PCT/DE2010/000774, filed Jul. 6, 2010, which designated the United States and has been published as International Publication No. WO 2011/003395 and which claims the priority of German Patent Application, Serial No. 10 2009 031 980.8, filed Jul. 6, 2009, pursuant to 35 U.S.C. 119(a)-(d).

BACKGROUND OF THE INVENTION

The invention relates to a method for fastening an exhaust gas converter module to an internal combustion engine of a motor vehicle and to a device for fastening an exhaust gas converter module to an internal combustion engine of a motor vehicle.

An exhaust gas converter module within the context of the invention is part of the exhaust gas system of a motor vehicle, in particular a catalytic converter which, in addition to an inlet flange, an outlet flange with corresponding funnel-shape regions, and a housing of a monolith also includes a heat shield and corresponding sensor receptacles. It is therefore a relatively complex assembly having a not insubstantial weight and volume. Durability problems resulting from thermally induced stress may occur due to the high thermal load when fastening such exhaust gases modules. Installation and removal in the immediate vicinity of the engine is often difficult.

For example, DE 10 2004 023 585 A1 describes an attachment for a catalytic converter which is constructed so as to prevent exposure of the catalytic converter to additional thermal stress from additional welding operations. In particular, the catalytic converter may be attached in the region of a pipe carrying exhaust gas, i.e., at a distance from the actual catalytic converter, so that the catalytic converter can elastically expand in the X, Y and Z directions without constraint. However, disadvantageously, the relatively large weight of the catalytic converter must be transferred to a mount arranged at the distance from the catalytic converter, which requires a sufficiently stable attachment, in particular for controlling vibrations.

DE 10 2006 010 973 A1 discloses a device for suspending that part of an exhaust gas system of a motor vehicle which includes a support structure with a swivel support. An elastic suspension part can be mounted on the swivel support. The suspension device is intended to facilitate adjustment of very different load requirements and, in particular, to facilitate repair, without requiring substantial changes in the basic structure of the suspension device, in particular of additional elastomer bodies. The support structure is particularly a die-cast component made of aluminum or a plastic part, with a relatively complex geometry which is difficult to manufacture. Although several support structures can be employed with an attachment compensating tolerances, which is particularly advantageous for damping vibrations, this alone is not sufficient for attaching an exhaust gas converter module which has a relatively large weight and is subjected to extreme thermal stress.

On this basis, it is the object of the invention to provide, on one hand, a method for easy installation of an exhaust gas converter module on an internal combustion engine of a motor vehicle, as well as a corresponding device for fastening an exhaust gas converter module which allows a sufficiently stiff, but at the same time tolerance-compensating attachment of the exhaust gas converter module.

SUMMARY OF THE INVENTION

This object is attained according to the invention with a method for fastening an exhaust gas converter module to an internal combustion engine of a motor vehicle, which includes the steps of fastening an engine bracket to the internal combustion engine, fastening a module bracket to the exhaust gas converter module, connecting an inlet opening of the exhaust gas converter module to a pipe section of an exhaust gases system arranged upstream of the exhaust gas converter module in a flow direction of exhaust gas, wherein the exhaust gas converter module and the pipe section define a Divot axis about which the exhaust gas converter module can be pivoted with respect to the pipe section, and pivoting the exhaust gas converter module above the pivot axis into an installation position, and connecting the module bracket to the engine bracket.

First, an engine bracket is attached on an internal combustion engine. The term internal combustion engine includes the engine block as a core component. However, it would also be feasible to connect the engine bracket indirectly with the internal combustion engine by way of suitable consoles or attachment parts. The term engine bracket indicates a bracket designed for the engine side.

The counterpart to the engine bracket is the module bracket which is attached on the exhaust gas converter module. Preferably, the module bracket is connected with the exhaust gas converter module by a material connection, in particular welded. The engine bracket and the module bracket are the core components required for fastening the exhaust gas converter module.

During the installation, the inlet opening of the exhaust gas converter is connected to a pipe section of the exhaust gas system arranged upstream in the flow direction of the exhaust gas. This pipe section may be, for example, an exhaust gas outlet of a charge machine, in particular of a turbocharger. After the exhaust gas converter module has been loosely connected with the inlet opening, the exhaust gas converter module is pivoted about a pivot axis defined by the orientation of the inlet opening of the exhaust gas converter module. The pivot axis is, in particular, perpendicular to the inlet opening. A centering shoulder arranged on the inlet opening provides in cooperation with the upstream pipe section the required axial and radial centering.

With pivoting motion, the exhaust gas converter module with the module bracket approaches the pre-mounted engine bracket, so that the exhaust gas converter module reaches an installation position where the module bracket is connected with the engine bracket. This connection is implemented by a screw connection. When the screw connection is established, a bolt protruding from the engine bracket, which during pivoting into the installation position engages with an opening of the module bracket, is initially used to screw on a nut. The nut is not yet torqued to the final torque. A second screw connection employs a nut disposed on the engine bracket, with a threaded bolt held on the module bracket being pivoted towards the nut. This bolt is also initially secured by a nut. The nuts can be screwed on by hand. The nuts are torqued to the final torque only after the exhaust gas converter module has been properly positioned.

Play may be compensated in that the screw connections have crosswise arranged slots. In other words, the screws on the engine bracket and on the module bracket are each supported in slots, wherein these slots do not have the same orientation. Because the orientations of the slots cross each other and because the orientation of the bolts is not congruent, the exhaust gas converter module can be moved during installation in three dimensions within limits for compensating tolerances. The two screw connections are torqued to the final torque only when the exhaust gas converter module is in the correct position. The bolts need hereby be only accessible from one side. Preferably, these bolts have a bolt head which is guided in a cage. The cage prevents the bolts from co-rotating when the nuts are torqued. In addition, the bolts are captively held by the cages on the engine bracket and the module bracket, respectively.

Of course, the pivotable inlet opening of the exhaust gas converter module is rigidly connected with the upstream pipe section, in particular by a friction joint, which is realized with a clamp encompassing the two pipe sections, by which the components are clamped together.

The part of the invention relating to the device is attained by a device having an engine bracket connected to the internal combustion engine, a module bracket matching the engine bracket and connected with the exhaust as converter module, said exhaust gas converter module having an inlet opening configured to be coupled to a pipe section of an exhaust gas system arranged upstream of the gas converter module in a flow direction of exhaust gas, and at least one screw connection for attaching the module bracket to the engine bracket after the exhaust gas converter module is pivoted with respect to the pipe section about a pivot axis into an installation position such that the module bracket abuts the engine bracket.

The device according to the invention includes, as previously described, an engine bracket connected to the internal combustion engine and a module bracket connected to the exhaust gas converter module and configured for matching engagement with the engine bracket. An inlet opening of the exhaust gas converter module can be coupled to a pipe section of the exhaust gas system arranged upstream in the flow direction of the exhaust gas. The exhaust gas converter module and the pipe section hereby define a pivot axis S about which the exhaust gas converter module can be pivoted into an installation position with respect to the pipe section and/or with respect to the internal combustion engine. In the installation position, the module bracket abuts the engine bracket. In this position, the module bracket and the engine bracket are screwed together by way of at least one screw connection.

BRIEF DESCRIPTION OF THE DRAWING

The invention will now be described with reference to an exemplary embodiment illustrated in the drawings, which show in.

DETAILED DESCRIPTION OF PREFERRED EMBODIMENTS

Figure 1:
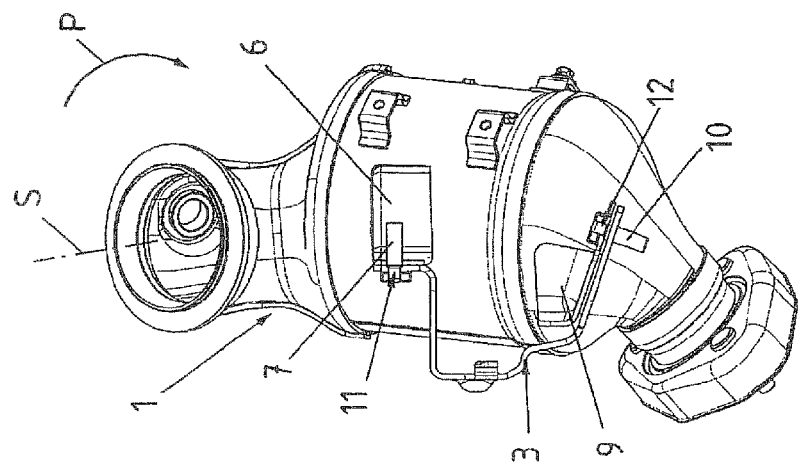
FIG. 1 a sequence of process steps for fastening an exhaust gas converter module on an internal combustion engine.
Figure 1:
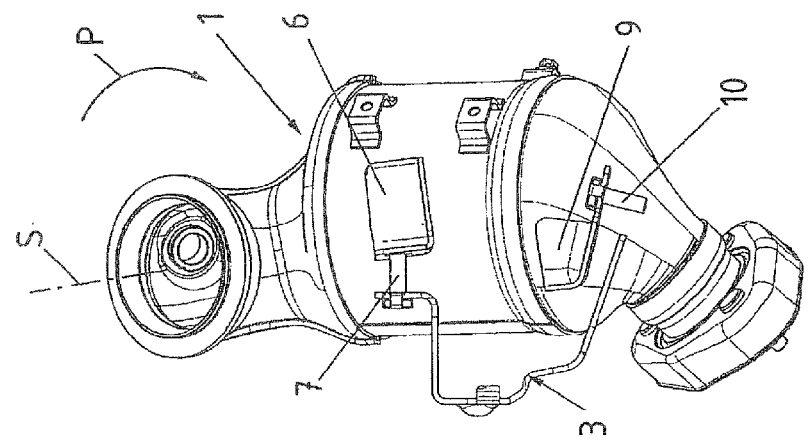
Figure 1:
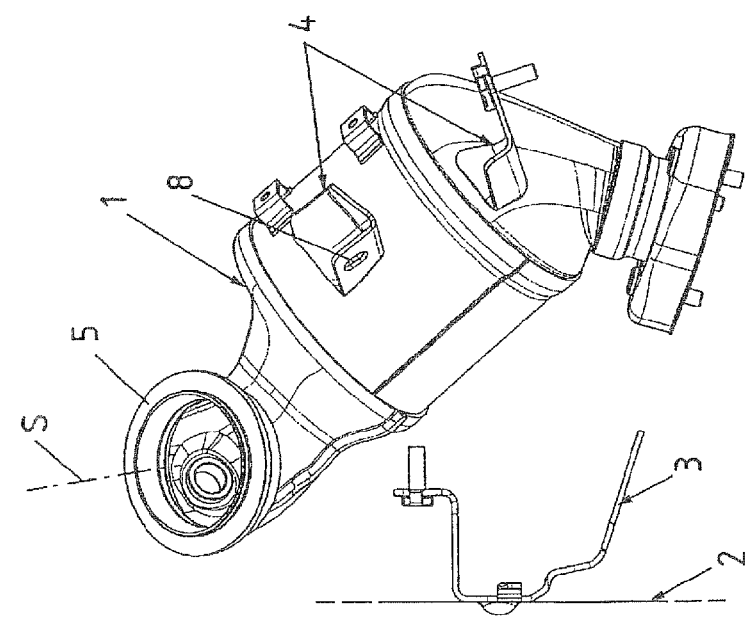

FIG. 1 shows in three time-sequential manufacturing steps the basic flow of the installation of an exhaust gas converter module 1. Before the exhaust gas converter module 1 can be connected with an only schematically depicted internal combustion engine 2, an engine bracket 3 is first connected to the internal combustion engine 2 with a screw connection. A module bracket 4 constructed in two parts and configured to match the engine bracket 3 was previously welded to the exhaust gas converter module 1. The exhaust gas converter module 1 pre-mounted in this manner is first attached with its inlet opening 5 on an upstream pipe section of the exhaust gas system (not shown). This pipe section may be, in particular, the output of an exhaust gas turbocharger attached proximate to the engine in the region of the cylinder head of the internal combustion engine 2. The inlet opening 5 has an annular flange collar, allowing the entire exhaust gas converter module 1 to be pivoted about a pivot axis S, when the exhaust gas converter module 1 and/or its inlet opening 5 are already positioned opposite the upstream pipe section. The pipe section and the inlet opening 5 in combination define the pivot axis S about which the exhaust gas converter module 1 can be pivoted with respect to the pipe section and hence also with respect to the internal combustion engine 2. In a practical embodiment, the inlet opening 5 is connected to the upstream pipe section with a clamp providing a clamping action. However, the clamp is not yet torqued, so that the exhaust gas converter module 1 can still be pivoted with respect to the engine bracket 3.

FIG. 1b) shows the exhaust gas converter module 1 already pivoted in the direction of the arrow P about the pivot axis S. An upper support 6 of the module bracket 4 hereby contacts a bolt 7 protruding from the engine bracket 3. The bolt 7 engages in an opening 8 disposed in the upper support 6 and formed as a slot.

As can be seen, 3 in this position, the lower support 9 does not yet make contact with the engine bracket. The term lower support 9 in the context of the invention indicates the particular support which is arranged at a greater distance from the inlet opening 5 of the exhaust gas converter module 1 than the lower support 6. The upper support 6 is located in a center housing section of the exhaust gas converter module 1, whereas the lower support 9 is arranged on an outlet channel of the exhaust gas converter module 1 which is tapered like a funnel.

FIG. 1c) shows that the lower support 9 finally comes into contact with the engine bracket 3 when pivoted further in the direction of the arrow P. A bolt 10 of the lower support 9 which protrudes downwardly at an angle engages into an edge-side groove 21 of the engine bracket, as illustrated in the following figures. The exhaust gas converter module 1 can be fixedly attached in this position.

It is important that the exhaust gas converter module 1 is already properly oriented in the circumferential direction of the inlet opening as well as in the axial direction of the inlet opening when the inlet opening 5 is connected with the upstream pipe section. In other words, the position of the exhaust gas converter module is determined by the position of the inlet opening in the radial direction and in the axial direction of the inlet opening 5. The engine bracket 3 and the module bracket 4 are primarily used to fix the orientation, which is predetermined by the inlet opening, with respect to the internal combustion engine 2 and to absorb the relatively large weight of the exhaust gas converter module 1. The tolerance is then compensated between the engine bracket 3 and the module bracket 4 and not at the inlet opening.

After the exhaust gas converter module 1 has been oriented by the centering insert in the axial and radial direction and has been pivoted in the direction of the engine bracket, unillustrated nuts are placed on the fastening bolts 7, 10. The nuts are initially tightened by hand. Thereafter, the clamp fixing the inlet opening 5 of the exhaust gas converter module 1 is torqued to the final torque. Thereafter, the bolt 7 on the upper support 6 is torqued to the final torque. Finally, the nut on the lower bolt 10 is torqued to the final torque. This concludes the installation process.

Is important in this assembly process that the spaced-apart a screw connections 11, 12 on the upper and lower support 6, 9 have both bolts 7, 10 with different spatial orientations as well as attachment surfaces with different orientations. In this way, forces attacking from different directions can be absorbed and the exhaust gas converter module 1 can at the same time be securely fastened, in particular with simple installation steps.

Figure 2:
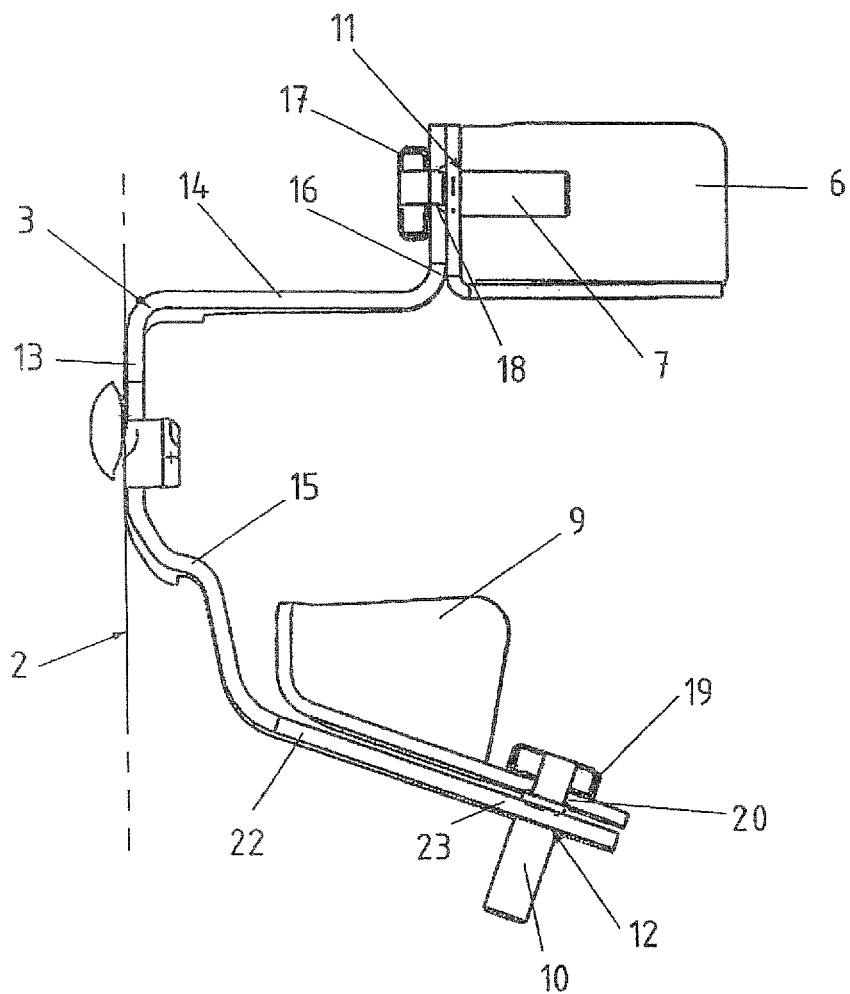
FIG. 2 an enlarged diagram of the engine bracket and the module bracket in the installation position.
Figure 3:
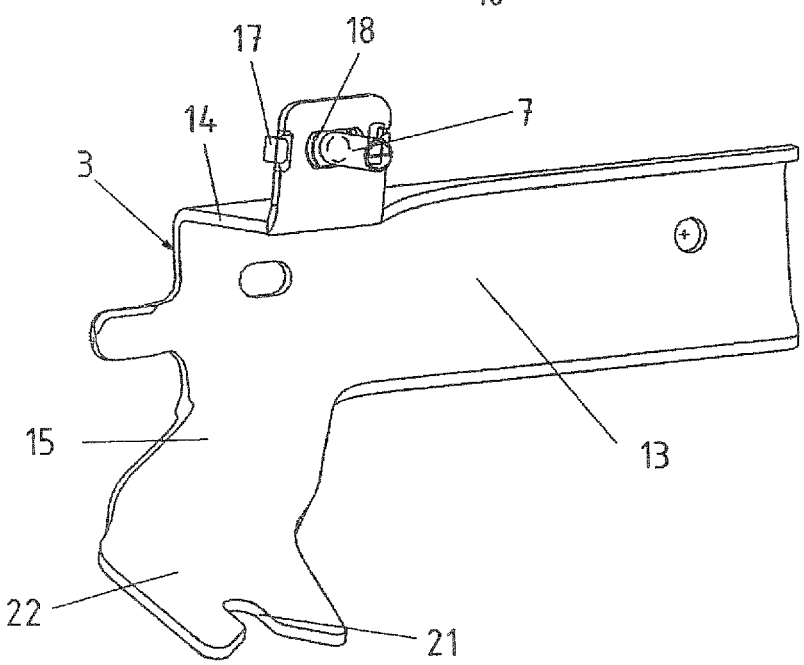
FIG. 3 a perspective view of the engine bracket.
Figure 4:
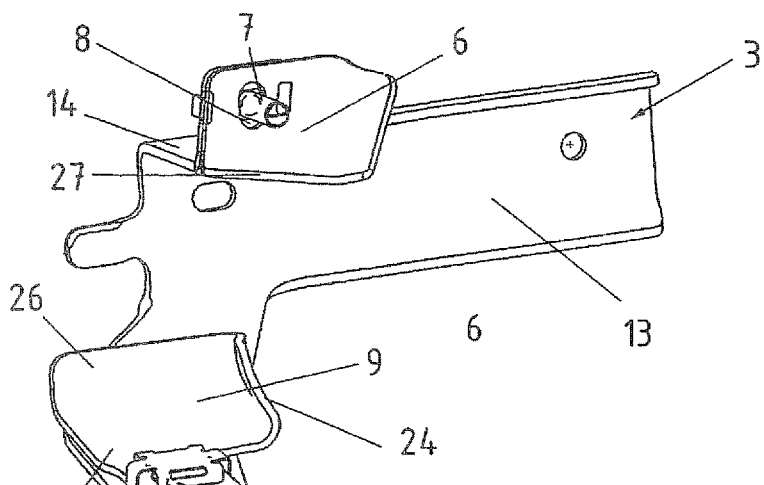
FIGS. 4 to 6 three additional perspective view was of the engine bracket with attached module bracket.

FIG. 2 shows in a simplified diagram of FIG. 1c the coupling between the engine bracket 3 and the upper support 6 and the lower support 9 of the module bracket 4 in the installed position. As can be seen, the engine bracket 3 is substantially U-shaped and includes a rear part 13 used for attaching the engine bracket 3 on the internal combustion engine 2. Upper and lower fastening straps 14, 15 are each angled with respect to this rear part 13, with the screw connections 11, 12 provided on the end regions 16, 23 of the fastening straps 14, 15. The fastening strap 14 at the top of the image plane is angled at a right angle with respect to the rear part 13, whereas its end regions 16 is angled by once more 90° with respect to the fastening strap 14 and thus extends again parallel to the rear part 13. The threaded bolt 7 which is retained by a so-called cage 17 on the end region 16 is located in this end region. The cage prevents the bolt 7 from co-rotating when an unillustrated nut is applied and torqued. The bolt 7 can also move inside a slot 18 wherein the longitudinal axis of the slot 18 in the illustration of FIG. 2 is perpendicular to the image plane. A comparison of FIGS. 3 and 4 shows that the slot 18 in the end region 16 is oriented at a right angle with respect to the opening 8 located in the upper support 6 and implemented as a slot. The upper support 6 and hence also the entire exhaust gas converter module can then orient itself not only in the direction of the slot 18, but also in the direction of the slot 18 of the engine bracket 3.

The same principle also applies to the lower support 9, where the bolt 10 of the screw connection 12 is likewise retained by a cage 19. The cage 19 is here located on the lower support 9. The bolt 7 is oriented downwardly, i.e., away from the upper support 6. The slot 20 through which the bolt 10 passes extends, like the slot 18 in the illustration of FIG. 2, out of the image plane or into the image plane. However, unlike in the screw connection 11 on the upper support 6, no second slot is provided in the engine bracket 3 at the lower support 9, but instead an edge-side groove 21, as best shown in FIG. 3. The groove 21 is again oriented transverse to the orientation of the slot 20. The exhaust gas converter module 1 can then also be connected to the engine bracket 3 by the second screw connection 12, while compensating for tolerances and without jamming.

It is also evident that a Delta-shaped expansion of the groove sides is arranged at the mouth of the groove 21. These expanded groove sides are used as insertion bevel for the bolt 10 which slides along the groove walls and slides centered into the groove 21.

FIG. 2 shows that the lower fastening strap 15 does not extend parallel to the upper fastening strap 14, but rather at an angle to the upper fastening strap 14 and more particularly also at an angle to the end region 16. The lower fastening strap 15 has thus a bevel 22 on which the lower support 9 runs up when pivoted into the installation position before the bolt 10 catches in the groove 21. The bevel 22 serves as an important support surface for the exhaust gas converter module 1. The bevel 22 also aids in the installation because if the exhaust gas converter module is somewhat tilted, the lower support 6 slides upward on the bevel 22, thereby lifting the upper support 6 and therefore the entire exhaust gas converter module until the end position and hence the correct height is attained.

The bevel 22 is located in an engine-proximate region, whereas the groove 21 is arranged in the outer end region 23. The bolt 10 is then quasi entrained in the groove 21 by the lower support 9 and is not pushed in front of the lower support 9 during the joining process. In this way, the existing installation space between the screw connection 12 and the rear part 13 of the engine bracket 3 is used effectively for support, without restricting the installation space required for torquing the screw connection 12.

Figure 5:
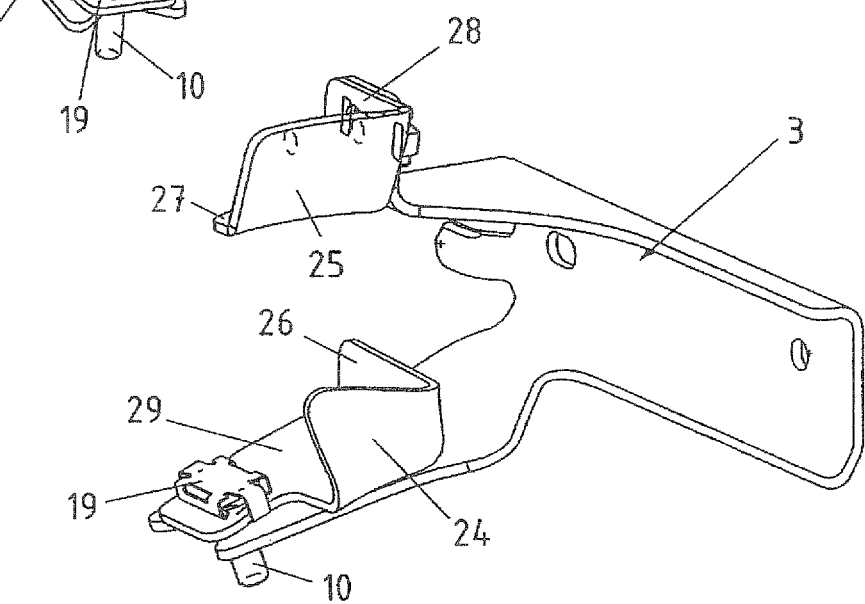
Figure 6:
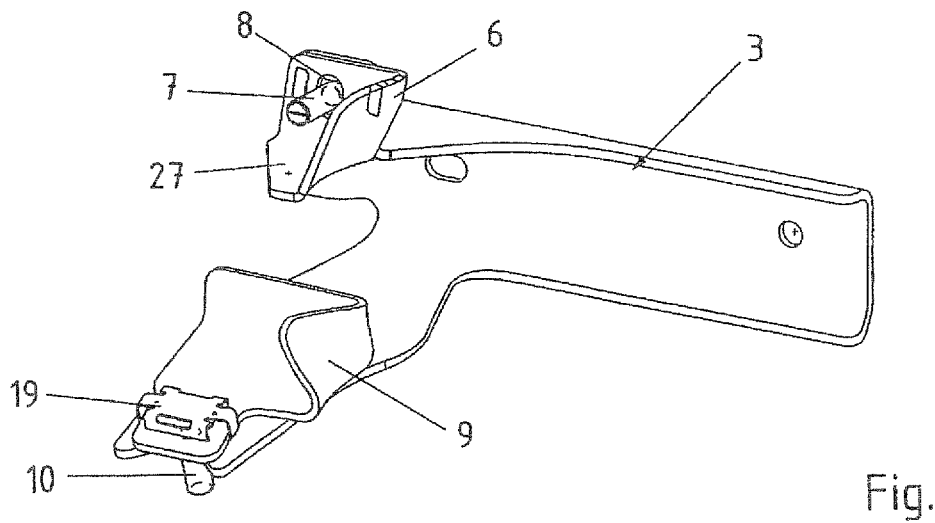

FIGS. 4 to 6 show once more the arrangement of FIG. 2 in different perspective views, illustrating all details of the two-part module bracket 4 and/or the engine bracket 3. As can be seen, the engine bracket 3 has a significantly larger size than the two smaller supports 6, 9 of the module bracket 4. The elongated rear part 13 of the engine bracket 3 has two bores, wherein the left bore in the image plane of FIG. 4 is implemented as a slot. The slot is oriented substantially horizontally, thereby determining the vertical position of the engine bracket 3. The tolerance between the engine bracket 3 and the module bracket 4 is additionally compensated via the corresponding slots and grooves, respectively, in the engine bracket 3 and/or the module bracket 4.

The upper and lower fastening straps 14, 15 of the engine bracket 3 are commonly located at the—in the image plane—left end of the engine bracket. A mounting strap 30 which projects slightly from the plane of the rear part 13 in the direction of the fastening straps 14, 15 is also located at this end and can be used for attaching additional attachment parts.

As is further evident, the upper support 6 and the lower support 7 each have a welded strap 24, 25, with which the supports 6, 9 are welded to the exhaust gas converter module 1, as well as an sidewall 26, 27 angled with respect to the welded strap 24, 25. The sidewall 26, 27 operates to reinforce the welded straps 24, 25 with respect to the actual support sides 28, 29 which either carry a bolt 10 or are penetrated by a bolt 7. The welded straps 24, 25, the angled support sides 28, 29 and the reinforcing sidewalls 26, 27 which are in turn angled with respect to the support sides 28, 29 and the welded straps 24, 25, produce three-dimensionally formed upper and lower supports 6, 9 which are rigid enough to securely couple the exhaust gas converter module 1 to the engine bracket 3 even with their small wall thicknesses. The support 6, 9, i.e. the module bracket 4 and the engine bracket 3, are sheet metal parts.

What is claimed is:

1. A method for fastening an exhaust gas converter module to an internal combustion engine of a motor vehicle, comprising the steps of:
    a) fastening an engine bracket to the internal combustion engine, said engine bracket comprising a first bolt protruding from the engine bracket;
    b) fastening a module bracket to the exhaust gas converter module, said module bracket having an opening and comprising a second bolt protruding from the module bracket;
    c) connecting an inlet opening of the exhaust gas converter module to a pipe section of an exhaust gas system arranged upstream of the exhaust gas converter in a flow direction of exhaust gas, wherein the exhaust gas converter module and the pipe section define a pivot axis about which the exhaust gas converter module can be pivoted with respect to the pipe section, and wherein the opening of the module bracket is arranged between the second bolt and the pivot axis along a direction between the inlet opening and an outlet opening of the converter module;

d) pivoting the exhaust gas converter module about the pivot axis into an installation position, said first and second bolts being arranged so that during the pivoting said first bolt engages in the opening of the module bracket along a direction defined by a longitudinal extent of the first bolt and said second bolt engages in a groove of the motor bracket along a direction transverse to a longitudinal extent of the second bolt e) engaging a first nut on the first bolt to create a first screw connection so as to prevent rotation between the exhaust gas converter module and the pipe section;

subsequent to the orienting step torquing the first bolt to a final torque; and forming a second screw connection by engaging a second nut on the second bolt.

2. The method of claim 1, wherein the exhaust gas converter module is frictionally connected to the pipe section by a clamp encompassing the exhaust gas converter module and the pipe section.

3. The method according to claim 1, wherein a second of the at least screw connection comprises a second bolt protruding from the module bracket, wherein the second bolt is moved during pivoting into a groove of the engine bracket.

4. The method of claim 3, wherein the second bolt of the module bracket is screwed together with the engine bracket with a second nut which is torqued to the final torque after the exhaust gas converter module is connected to the pipe section so as to prevent rotation.

5. A device for fastening an exhaust gas module to an internal combustion engine of a motor vehicle, comprising:

an engine bracket connected to the internal combustion engine, said engine bracket comprising a first bolt protruding from the engine bracket;

a module bracket matching the engine bracket and connected with the exhaust gas module, said module bracket having an opening and comprising a second bolt protruding from the module bracket, said exhaust gas module having an inlet opening configured to be coupled to a pipe section of an exhaust gas system arranged upstream of the exhaust gas module in a flow direction of exhaust gas, said exhaust gas converter module and said pipe section defining a pivot axis, the exhaust gas converter module being pivotal about the pivot axis with respect to the pipe section into an installation position such that the module bracket abuts the engine bracket, said opening of the module bracket being arranged between the second bolt and the pivot axis along a direction between the inlet opening and an outlet opening of the converter module, said first and second bolts being arranged so that during pivoting of the exhaust gas converter module into the installation position, said first bolt engages in the opening of the module bracket along a direction defined by a longitudinal extent of the first bolt and said second bolt engages in a groove of the motor bracket along a direction transverse to a longitudinal extent of the second bolt, said first bolt being constructed for threading engagement with a first nut in the installation position so as to prevent rotation between the exhaust gas converter module and the pipe section, said second bolt being constructed for threaded engagement with a second nut wherein the exhaust gas module is an exhaust gas converter module.

6. The device of claim 5, wherein the opening of the module bracket is constructed as a slot.

7. The device of claim 5, wherein the module bracket is constructed in two parts and comprises a lower support and an upper support arranged distal from the lower support lower support.

8. The device of claim 7, wherein the lower support and the upper support are connected to the exhaust gas converter module by a material connection.

9. The device of claim 5, wherein the first bolt points in a different spatial direction from the second bolt.

10. The device of the claim 9, wherein the first bolt and the second bolt are arranged in corresponding first and second slots.

11. The device of claim 10, wherein the first and second slots holding the first and second bolts have an orientation different from an orientation of an opening which is disposed in the module bracket and is configured as a slot and from an orientation of an edge-side groove disposed in the engine bracket.

12. The device of claim 10, wherein the first and second bolts are held captive in the first and second slots in corresponding first and second cages, wherein the first and second cages are constructed to enable displacement of the first and second bolts in a longitudinal direction of the first and second slots.

13. The device of claim 5, wherein the engine bracket is substantially U-shaped and comprises a rear part configured for fastening the engine bracket on the internal combustion engine and fastening straps angled with respect to the rear part, with the first bolt and the groove being arranged on respective end regions of the fastening straps.

14. The device of claim 13, wherein the module bracket is constructed in two parts and comprises a lower support and an upper support arranged distal from the lower support lower support, wherein one of the fastening straps comprises an edge-side groove for a bolt of the lower support and a bevel, with the lower support running up on the bevel when the exhaust gas converter module is pivoted into the installation position, before the bolt catches in the edge-side groove.

* * * * *

UNITED STATES PATENT AND TRADEMARK OFFICE
CERTIFICATE OF CORRECTION

PATENT NO. : 9,249,714 B2
APPLICATION NO. : 13/382241
DATED : February 2, 2016
INVENTOR(S) : Roland Ewers et al.

Page 1 of 1

It is certified that error appears in the above-identified patent and that said Letters Patent is hereby corrected as shown below:

Title page 2, column 2, line 4, under FOREIGN PATENT DOCUMENTS, please delete one "GB 2212771 A 8/1989" since it is listed twice.

In the claims,

In column 8, claim 14, line 3: please delete one "lower support" so it reads:
--arranged distal from the lower support, wherein-- instead of "arranged distal from the lower support lower support, wherein".

Signed and Sealed this
Third Day of May, 2016

Michelle K. Lee
*Director of the United States Patent and Trademark Office*